March 29, 1960   B. A. PROCTOR   2,930,243
DICTATION MACHINE
Original Filed April 19, 1950   6 Sheets-Sheet 1
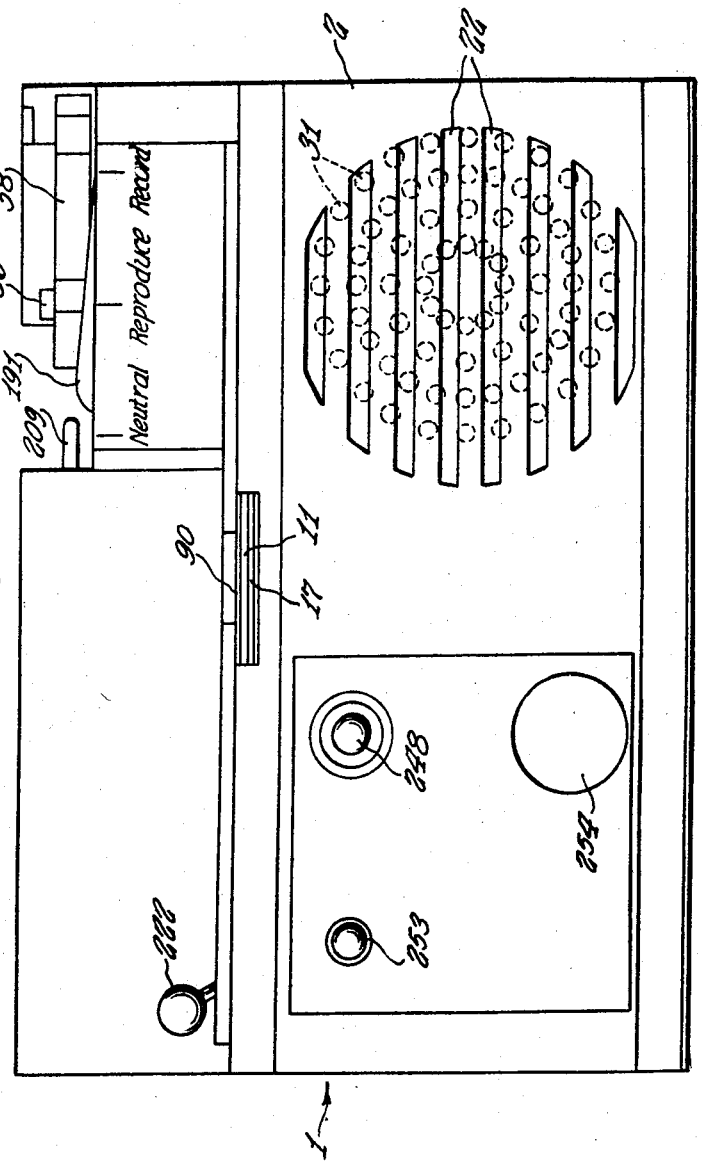
INVENTOR.
Barton A. Proctor
BY
Moses, Nolte + Nolte
ATTORNEYS

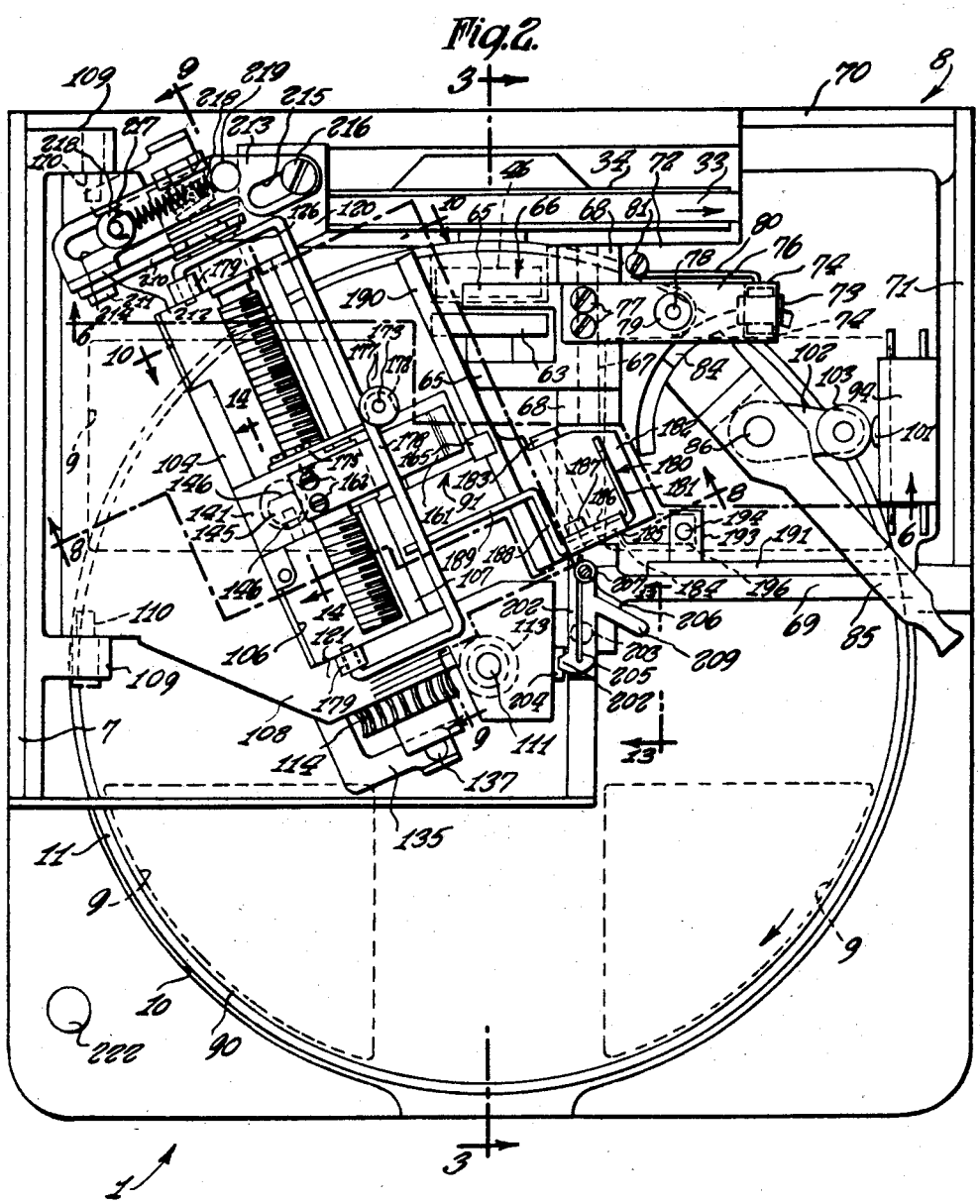

March 29, 1960   B. A. PROCTOR   2,930,243
DICTATION MACHINE
Original Filed April 19, 1950   6 Sheets-Sheet 3
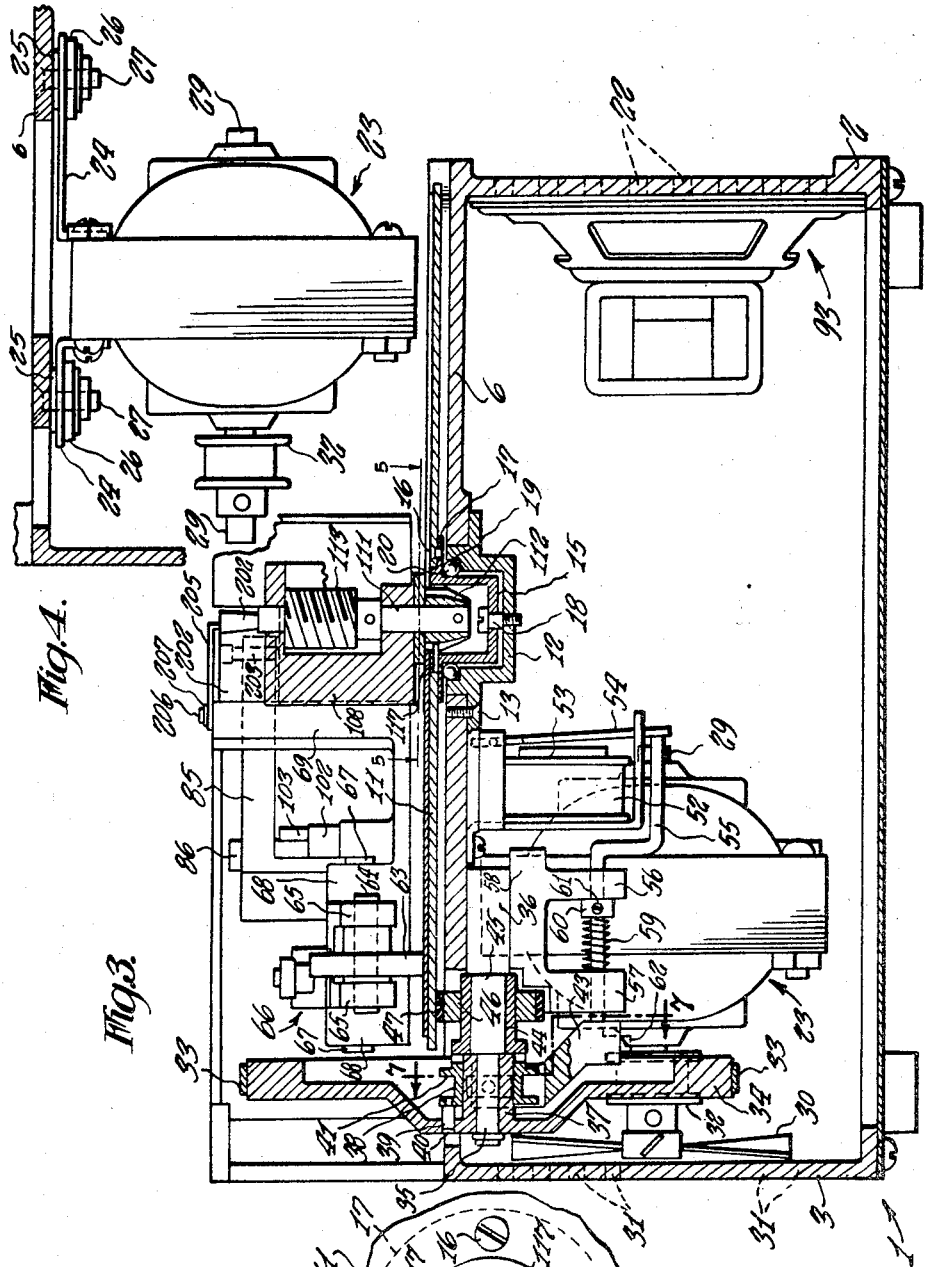
INVENTOR.
Barton A. Proctor
BY
Moses, Nolte & Nolte
ATTORNEYS March 29, 1960  B. A. PROCTOR  2,930,243
DICTATION MACHINE
Original Filed April 19, 1950  6 Sheets—Sheet 4
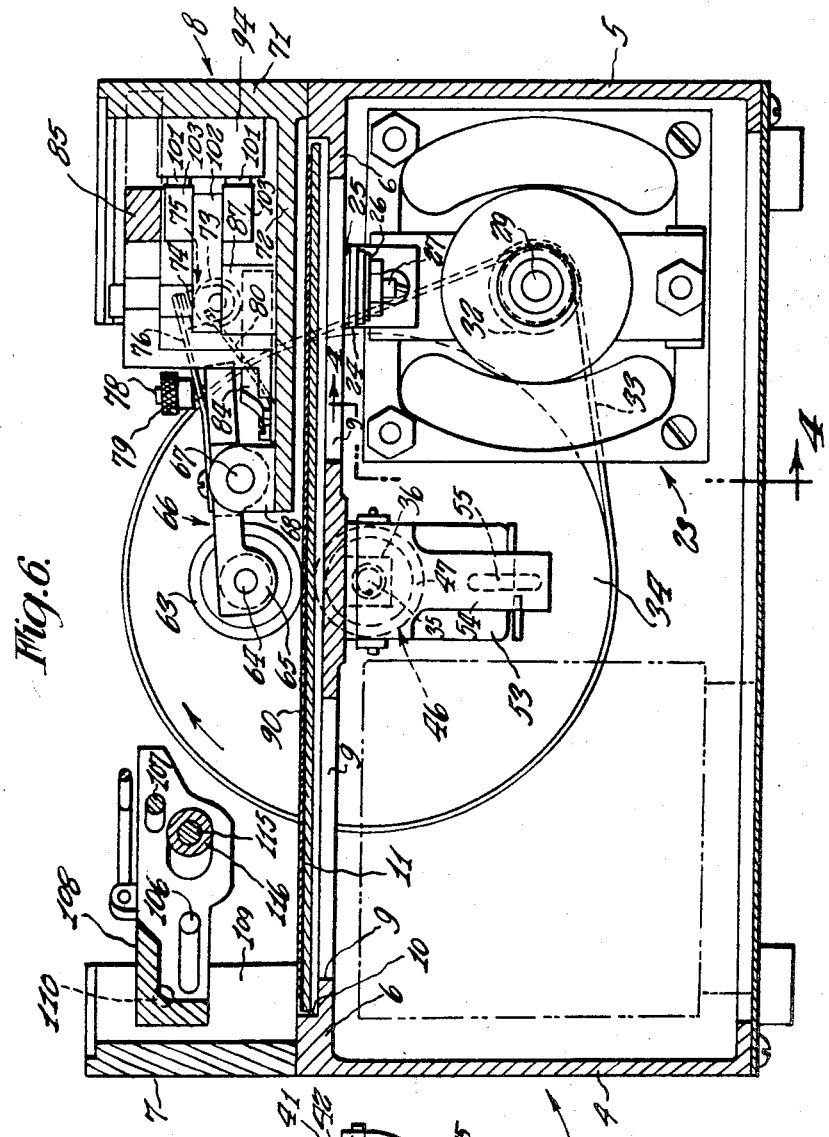
INVENTOR.
Barton A. Proctor
BY
Moses, Nolte & Nolte
ATTORNEYS

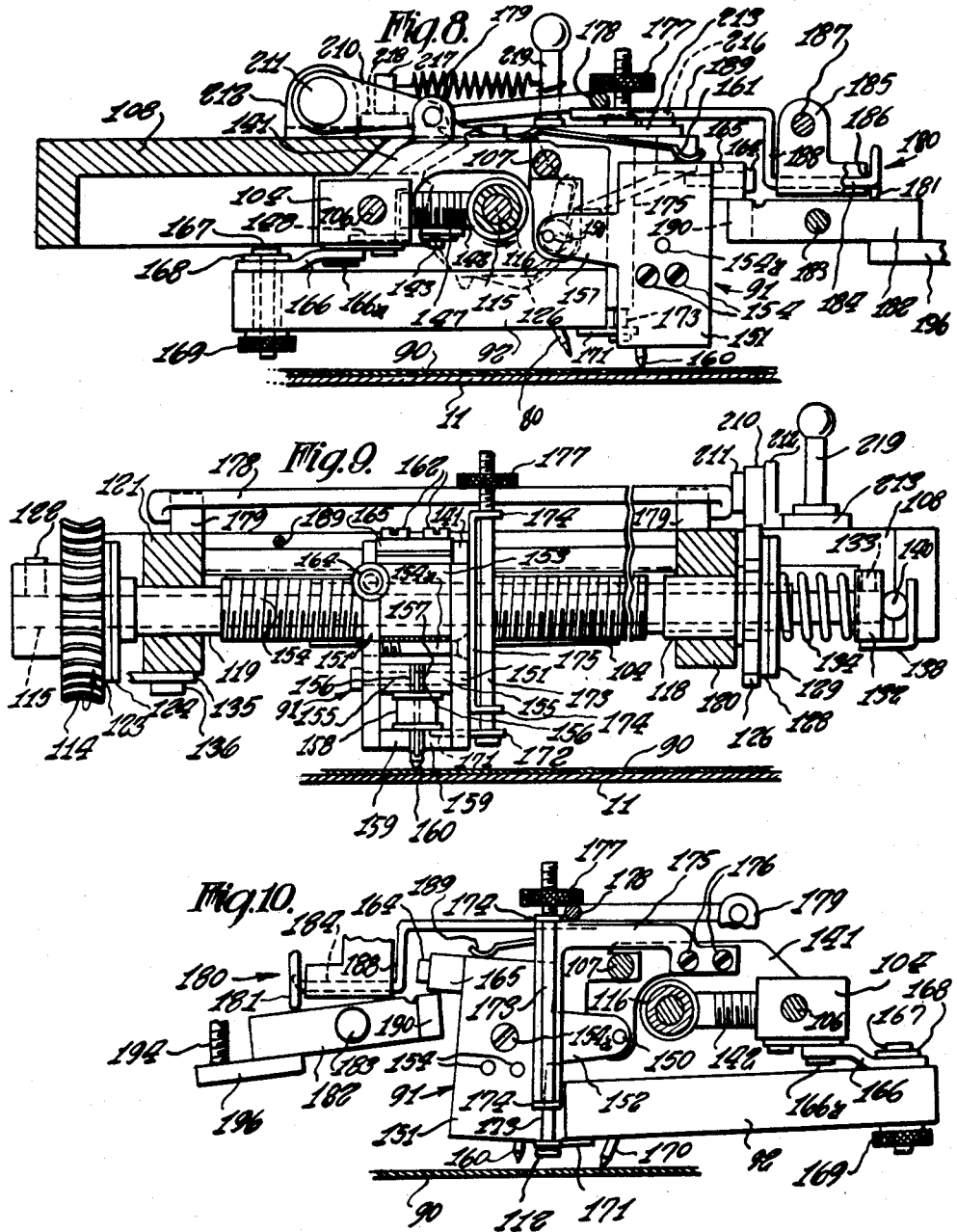

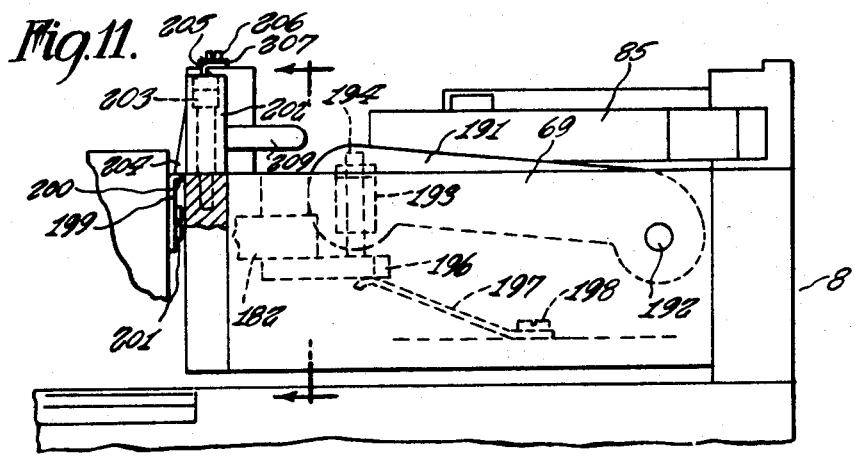
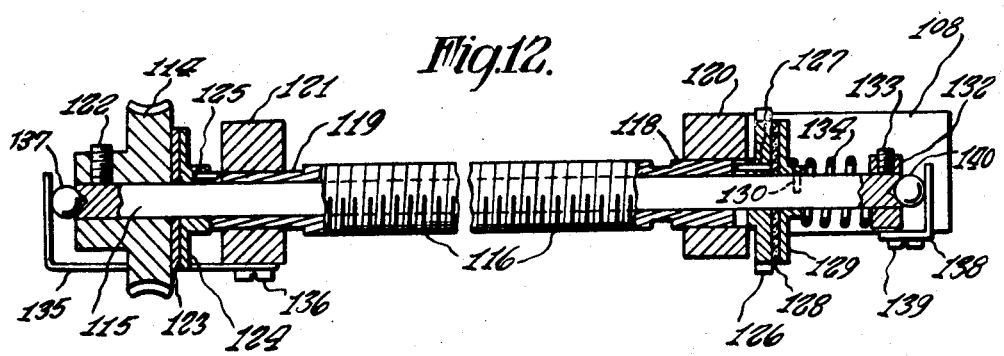
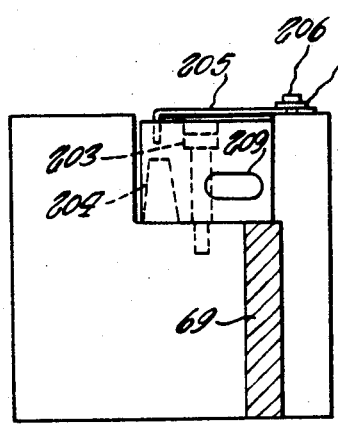
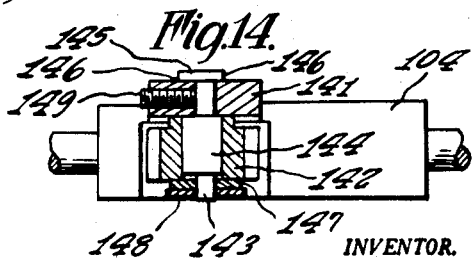
INVENTOR.
Barton A. Proctor
BY
Moses, Nolte + Nolte
ATTORNEYS United States Patent Office 2,930,243
Patented Mar. 29, 1960

2,930,243

DICTATION MACHINE

Barton A. Proctor, Larchmont, N.Y., assignor, by direct and mesne assignments, to Proctor Dictating Machine Corporation, New York, N.Y., a corporation of New York Original application April 19, 1950, Serial No. 156,869, now Patent No. 2,685,772, dated August 10, 1954. Divided and this application June 23, 1954, Serial No. 439,439

1 Claim. (Cl. 74—27)

This invention relates to dictation machines and has for its primary object the provision of a machine which will be of small size and light weight, inexpensive to manufacture and efficient and dependable in use.

A salient feature of the invention has to do with turntable drive mechanism, the turntable being driven from a constantly running motor through an operator-controlled electro-magnetic clutch.

A further important feature of the invention has to do with the drive of the pick-up and cutter carriage from the turntable, this drive being effected through a gear which is unitary with a carriage support and is swingable therewith into a position concentric with the turntable in which it is connected to be driven by the turntable.

A further feature of the invention has to do with novel back-spacer mechanism. In accordance with this feature, the carriage is operated through a feed screw, the feed screw being frictionally driven. A ratchet wheel affixed to the feed screw is adapted to be engaged and driven backward step by step, as desired. The carriage is thus backspaced while the record remains stationary.

Other objects and advantages will hereinafter appear.

In the drawing forming part of this specification:

Figure 1 is a view in front elevation of an illustrative machine embodying features of the invention;

Figure 2 is a plan view of the machine illustrated in Figure 1;

Figure 3 is a central sectional view taken upon the line 3—3 of Figure 2, looking in the direction of the arrows;

Figure 4 is a sectional view taken upon the line 4—4 of Figure 6, looking in the direction of the arrows;

Figure 5 is a fragmentary sectional view taken upon the line 5—5 of Figure 3, looking in the direction of the arrows;

Figure 6 is a sectional view taken upon the line 6—6 of Figure 2, looking in the direction of the arrows;

Figure 7 is a sectional view taken upon the line 7—7 of Figure 3, looking in the direction of the arrows;

Figure 8 is a sectional view taken upon the line 8—8 of Figure 2, looking in the direction of the arrows;

Figure 9 is a sectional view taken upon the line 9—9 of Figure 2, looking in the direction of the arrows;

Figure 10 is a sectional view taken upon the line 10—10 of Figure 2, looking in the direction of the arrows;

Figure 11 is a fragmentary view in front elevation, partly broken away, showing details of the principal manual control lever and associated parts;

Figure 12 is a vertical sectional view, showing the feed screw and drive mechanism associated with it;

Figure 13 is a sectional view taken upon the line 13—13 of Figure 2, looking in the direction of the arrows;

Figure 14 is a sectional view taken upon the line 14—14 of Figure 2, looking in the direction of the arrows.

The machine comprises a lower frame member 1 having front and rear walls 2 and 3 (Fig. 3), side walls 4 and 5 and a top wall 6 (Fig. 6). Frame extension members 7 and 8 are mounted upon the frame member 1.

The top member 6 is formed wtih cut-outs or openings 9 (Figs. 2 and 6) for lightening the structure, and with a recess 10 in which a turntable 11 operates. The top member 6 is formed with a circular opening concentric with the turntable axis. A flanged cup 12, Fig. 3, is fitted into a circular opening and is attached to the underside of the member 6 by fasteners 13 which extend through the flange 14 of the cup 12 and are threaded into the member 6.

The turntable 11 is, itself, formed with a central circular opening in which the upper rim of a flanged cup member 15 is fitted (Fig. 3). The turntable is attached by screws 16 to the cup 15, the screws being passed through the turntable and threaded into a flange 17 of the cup. A headed and shouldered bearing screw 18 is passed axially downward through the center of the base of the cup 15 and is threaded into the center of the base of the cup 12. The cup 12 is formed with a rabbet 19 in which a ball bearing 20 is mounted. The bearing balls are arranged to engage the cups 12 and 15 to provide steadying support and frictionless bearing for the turntable.

Beneath the top plate 6 of the casing member 1 there is provided a loudspeaker 21 (Fig. 3) which is attached in any suitable manner to the front frame wall 2. The wall 2 is provided with louvers 22 which conceal and protect the loud speaker while permitting the sound to issue naturally from the interior of the frame.

Mechanism for driving the turntable is also supported beneath the wall 6, being suspended from the wall 6, itself. The drive mechanism comprises a motor 23 (Figs. 3, 4 and 6) which is carried by brackets 24. The brackets 24 are secured between felt washers 25 and 26 upon the shanks of screws 27. The parts are clamped together by means of nuts 28 threaded on the respective screws 27. The motor shaft 29 has fast upon it a fan 30 for circulating cooling air, and the wall 3 adjacent the fan is formed with numerous perforations 31 so that air may pass through. The shaft 29 also has fast upon it a flanged pulley 32 which, through a belt 33, drives a massive pulley 34 of comparatively large diameter. The pulley 34 serves also as a fly-wheel.

The pulley 34 is revolubly mounted upon a shaft 35 (Fig. 3), which shaft is supported from the wall 6 by a block 36. The pulley 34 includes a central sleeve portion 37 which bears upon the shaft 35. A clutch member 38 is slidably mounted upon the sleeve portion 37 and is formed with one or more projecting pins 39 which pass into openings 40 of the pulley 34 so that the clutch member will always turn in unison with the pulley, regardless of its position axially of the shaft. The clutch member 38 is formed with a circumferential groove 41 in which shoes 42, see Fig. 7 also, of a shifting fork 43 are received. The clutch member 38 is adapted to be shifted into and out of engagement with a complementary clutch member 44.

The clutch member 44 is revolubly mounted upon an enlarged portion 45 of the shaft 35 between the block 36 and the inner end of the sleeve portion 37 of the pulley 34. The clutch member 44 carries a feed wheel 46 having a rubber tire 47 which is adapted to bear against the lower face of the turntable 11 for driving the turntable.

The purpose of the clutch is to enable the motor 23 and the pulley 34 to run constantly while permitting the turntable to be started and stopped at will.

As the parts are shown in Figure 3, the electro-magnet 70 is unenergized, so that the spring 59 is effective through the fork 43 to shift the clutch member 38 into engagement with the clutch member 44, thereby to drive the feed wheel 46. Current flows through the winding 52 of the electro-magnet, causing the armature 54 to be drawn toward the left against the resistance of the spring 59, and causing the clutch member 38 to be shifted to a disengaged position. The clutch member 38 continues to turn with the pulley 34 but the clutch member 44 and the feed wheel 46 come quickly to rest.

Although the feed wheel 46 is adapted to engage the lower margin of the turntable 11, it does not do so unless the turntable, which is slightly bendable but resilient, is pressed down against the roller 46. For bending the turntable 11 downward and pressing it against the feed wheel 46, an idler roller 63 is provided, this roller being located above the turntable and a short distance inward from the feed wheel 46 (Figs. 3 and 6). The roller 63 is revolubly supported upon a pivot pin 64 which is carried between ears 65 of a lever 66. The lever 66 is supported upon a rock shaft 67 which is carried by ears 68 of the bracket member 8. The bracket member 8, it will be noted, comprises a front wall 69 (Fig. 2), a rear wall 70, a side wall 71 and a bottom wall 72. All of the walls except the walls 70 and 71 stand at a level to provide comfortable clearance space above the turntable for the record. The ears 68 are disposed at the left hand extremity of the bottom wall 72 (see Fig. 6).

The lever 66 is controlled by a cam follower roller 73 (Figs. 2 and 6). The roller 73 is pivotally supported between ears 74 of a bail member 75. The member 75 is affixed to a spring leaf 76 which constitutes an extension of the lever 66. The leaf 76 is secured to the lever 66 by screws 77 and is capable of bending away from the lever to a limited extent. An upstanding threaded stem 78 is provided on the end of the lever 66 to extend upward through the spring leaf. A knurled adjusting nut 79 is threaded on the stem 78 in position to overlie the spring leaf 76 and to limit bending of the latter. A leaf spring 80 secured at one end to the wall 72 by screw 81 has its free end disposed to engage in a hole in one of the ears 74 and bear downwardly so as to urge the lever 66 constantly in a clockwise direction (Fig. 6).

The roller 73 rides upon a cam formation 84 which is fixedly secured upon a manual control lever 85. The lever is fixed upon an upright stem or shaft 86 which is rotatably mounted in a post 87, the post forming part of the bracket wall 72. The lever 85 is operable to an extreme left-hand position marked "neutral" (Fig. 1) to carry the low portion of the cam 84 beneath the follower roller 73, thereby to cause the idler roller 63 to be lifted out of engagement with the record 90. As soon as the pressure of the roller 63 against the record 90 is relieved, the turntable margin springs upward out of engagement with the feed roller 46.

Next to the low portion which is effective in the neutral condition, the cam has a sloping portion which leads into an extensive high portion of uniform height. This portion of the cam is effective both in the intermediate position of the lever 85, which is the reproducing position, and in the right-hand position of the lever, which is the recording position. The idler roller 63 therefore makes the feed roller 46 effective in both the reproducing and the recording positions of the lever 85. Whether or not the record will be fed will still depend, however, upon whether the switch plunger 48 is thrust inward or is left free. When the lever 85 is moved to the neutral position, however, the drive mechanism is rendered inoperable to drive the record regardless of the condition of the switch plunger 48.

The pickup 92 and cutter 91 are mounted upon a carriage 104 (Figs. 2 and 8), whereby they are shifted or fed from the outer margin toward the center of the record as the recording or reproducing progresses. The carriage is supported and guided upon a pair of parallel rods 106 and 107 which are supported in the rockable frame 108 (see Fig. 6 also). The frame 108 is rockably supported in bearing arms 109 of the side bracket 7 by means of bearing screws 110. The purpose of rockably supporting the bracket 108 is to enable the bracket and the parts carried by it to be rocked up out of the way when a record is being put in place upon the turntable 11 or removed from the turntable, and to establish a drive from the turntable to the carriage after the record has been put in place.

The frame 108 revolubly supports a shaft 111 (Figs. 2 and 3) upon the lower end of which a gear-like member 112, having straight and beveled tooth portions, is made fast (see Fig. 5 also). The rod or shaft 111 also has fast upon it a worm 113 which drives a worm wheel 114. The worm wheel 114 is mounted upon a shaft 115 upon which a feed screw 116 is also mounted, the worm wheel being connected to drive the feed screw frictionally, as will be presently described and explained. The gear 112 is positively driven from the turn table by means of pins 117 which are set in the rim of the cup member 15 and protrude radially inward beyond the wall of the cup to engage between the teeth of the gear member 112. As the gear member is lowered into place, the pins 117 readily find the grooves between the teeth of the gear.

The assembly for frictionally driving the feed screw 116 is best illustrated in Fig. 12. The feed screw includes bearing portions 118 and 119 which are mounted respectively in bearing arms 120 and 121 of the rocking frame 108. A shaft 115 passes freely through the feed screw, is rotatably supported by it, and serves to support the other parts of the assembly.

The worm wheel 114 is made fast upon the shaft 115 by means of a set screw 122. A friction washer 123 is interposed between the worm wheel 114 and a disc 124. A pin 125 projects from the hub of the disc 124 and enters a notch in the end of the feed screw 116 for driving the screw.

At the right hand side of the bearing arm 120, there is mounted on the shaft 115 a back-spacing ratchet wheel 126 whose hub is provided with a pin 127 which enters a slot in the bearing portion 118 of the feed screw for constraining the feed screw and the ratchet wheel to turn at all times in unison with one another. A friction washer 128 is pressed against a face of the ratchet wheel 126 by a disc 129. A pin 130 secured in the shaft 115 to extend radially outward therefrom is received in a slot formed in the hub of the disc 129. A collar 132 is affixed to the shaft 115 by a set screw 133, the collar being disposed at a short distance from the disc 129. A compression coil spring 134 surrounds the shaft between the collar 132 and the disc 129 and bears at its opposite ends against the collar and the disc to urge them away from one another.

Since the pin 130 causes the disc 129 to be positively driven by the shaft 115, the disc acts through the washer 128 to frictionally drive the ratchet wheel 126, and through the ratchet wheel to frictionally drive the feed screw 116. Thus the frictional drive of the feed screw is accomplished directly from the worm wheel 114 through the washer 123 and the disc 124 and indirectly from the worm wheel 114 through the shaft 115, the disc 129, the washer 128 and the ratchet wheel 126. The tendency of the spring 134 is to move the disc 129 toward the left relative to the shaft 115 and the worm wheel 114. Equal pressures are applied by the spring to the two frictional driving clutches described.

An angle bracket 135 secured upon the bearing arm 121 by means of a screw 136 is formed with an upturned arm which engages a bearing ball 137. The bearing ball bears in a conical recess formed in the left hand end of the shaft 115. Similarly, an angle bracket 138 secured to the rocking frame 108 by means of a screw 139 is formed with an upturned end which engages a bearing ball 140. The bearing ball 140 engages in a conical recess formed in the right hand end of the shaft 115. Thus, the longitudinal position of the shaft is fixed while the feed screw and its associated parts can be moved longitudinally of the shaft by the spring 134 to provide the desired bearing pressure against the friction washer 123 and the worm wheel 114.

It is desirable that the carriage shall be fed from the circumferential margin toward the center of the record as the recording or reproducing progresses, and it is for this purpose that the feed screw is provided. It is also desirable, however, that the carriage shall be movable along the feed screw when desired, independently of rotation of the feed screw. The carriage 104 includes a forwardly reaching arm 141 (Figs. 2, 8 and 14) upon which a worm gear 142 is carried for engaging the feed screw.

A shaft 143 having an eccentric bearing portion 144 is rotatably mounted in the arm 141. A disc 145 having opposed parallel flat faces 146 is secured upon the shaft 143 above the arm 141 and provides a means whereby the shaft can be rotatably adjusted. The worm gear 142 is rotatably mounted upon the eccentric bearing 144. A friction washer 147 of felt or other suitable material bears against the lower face of the gear 142, being pressed thereagainst by a metallic plate 148 which is secured upon the lower end of the shaft 143.

The shaft 143 is normally fixed against rotation by means of a set screw 149, the set screw being threaded through a portion of the arm 141 into engagement with the shaft. The set screw may be loosened, however, to permit rotation of the shaft, at which time the upper disc or head 145 would be engaged by a wrench and turned. Such turning is effective to adjust the rotative position of the eccentric bearing 144 and, therefore, to shift the worm wheel 142 toward and from the feed screw 116 so as to bring about a proper engagement of the parts. When the desired adjustment has been effected, the set screw 149 is tightened.

The friction exerted by the washer 148 and plate 147 normally prevents rotation of the worm gear 142 about the axis of the eccentric bearing 144. When it is desired, however, to thrust the carriage toward one end or the other of the feed screw 116, the washers 147 and 148 offer no substantial impediment to such operation.

The carriage pivotally supports the cutter 91 upon a bearing pin 150 (Figs. 8 and 10), the cutter including ferro-magnetic side plates 151 (Fig. 9) formed with ears which bear upon the pin 150. A permeable block 153 is clamped between the upper ends of the plates 151, the plates being drawn toward one another by means of screws 154 and a screw 154a. The plates carry upper inwardly reaching blocks 155 which, through the medium of non-permeable spacers 156, clamp between them the upper end of a thin blade-like ferro-magnetic stylus carrier 157. The stylus carrier extends downward through a coil 158 and between inwardly reaching pole pieces 159. The cutting stylus 160 is secured in the carrier 157 to extend beyond the lower end thereof.

A leaf spring 161 is secured upon the arm 141 by screws 162. The spring normally bears against the upper end of the cutter 91, pressing it downward against the record with a desired cutting pressure. As will be explained, however, the cutter is adapted to be rocked upward against the resistance of the spring and held in elevated position when the machine is set in either the neutral or the reproducing condition. For this purpose, the cutter is provided on its forward face with a bearing pin 164 upon which a roller 165 is rotatably mounted. A description of the remainder of the mechanism for rocking the cutter will be deferred for the present, but will be given after the construction and mounting of the reproducing pickup has been described.

The reproducing pickup 92 (Fig. 8) is flexibly and yieldably carried upon a sheet 166 of rubber or other suitable material. The sheet 166 is secured at one end to the carriage 104 by a screw 166a and at the other end to the pickup 92 through a headed screw 167, a washer 168 and a knurled nut 169. The shank of the screw 167 passes down through the washer 168 and the body of the pickup 92 and has the nut 169 threaded upon its lower end. The mounting can be made more or less rigid as desired, by tightening or backing off the nut 169. The connection of the rubber plate 166 to the pickup 92 is at the rear end of the pickup, while the reproducing stylus 170 is carried at the opposite or forward end of the pickup body. At the forward end, a strap 171 is secured to the lower face of the pickup body and is provided with an ear 172 through which a headed pin 173 is passed upward.

The pin 173 also extends through out-turned ears 174 (Figs. 9 and 10) of a stationary bracket 175, the bracket being mounted upon the carriage arm 141 by means of screws 176. The upper end of the pin 173 is threaded and has screwed onto it a nut 177 which may be adjusted in position as desired. A bail 178 pivotally mounted in posts 179 (Figs. 2, 8 and 9) of the frame 108 has its body portion disposed beneath the nut 177. The body portion of the bail 178 extends parallel to the axis of the feed screw 116 and is therefore in position to cooperate uniformly with the nut 177 in any position to which the nut may be moved by the carriage 104. The bail 178 is provided for the purpose of shifting the reproducing stylus 170 into and out of engagement with the record. The mechanism for bringing about such operation will now be described.

It will be remembered that recording conditions are established by shifting the lever 85 to its right-hand limit of movement, as illustrated in Figures 1, 2 and 11, that reproducing conditions are established by shifting the lever 85 to an intermediate position, and that neutral conditions are established by shifting the lever 85 to its left-hand limit of movement.

With the lever 85 in the recording position, the reproducing stylus 180 is held up by the bail out of engagement with the rod, while the recording stylus 160 is permitted to engage the record.

The bail 178 is held up at this time by a wire lever 180 (Figs. 2 and 8). The lever 180 has an arm 181 which rests upon the upper surface of a shelf lever 182, the latter lever being supported for rocking movement upon a headed pivot pin 183 that extends parallel to the axis of the feed screw. The body portion 184 of the lever 180 is rockably mounted between plates 185 and 186 to define a pivot that extends in a plane at right angles to the axis of the feed screw. The plates 185 and 186 are secured to the front portion of the frame extension 8 by means of a screw 187. The lever 180 has a second arm 188, whose outer end is turned to form a long finger 189 that extends parallel to the pivotal axis of the lever. The finger 189 extends beneath the bail 178.

The finger 189 is raised when the shelf lever is rocked in a direction to raise the arm 181 and is lowered when the shelf lever 182 is rocked in a direction to allow the arm 181 to be lowered. Raising of the finger 189 raises the bail and lifts the reproducing stylus 170 out of contact with the record. Lowering of the finger 189 permits the bail 107 to descend and the reproducing stylus 170 to be lowered into engagement with the record, 90.

The shelf lever 182, which controls the lifting and lowering of the reproducing stylus 170 through the train of mechanism described, coordinately and concomitantly controls the lowering and lifting of the recording stylus 160. The shelf lever, at the opposite side of its pivot from the side engaged by the arm 181, is formed with a prolongation in the form of a rail 190 that extends parallel to the axis of the feed screw. The roller 165 which is carried by the cutter rides upon the shelf lever and the rail prolongation thereof throughout the travel of the cutter with the carriage. In the position of the parts illustrated in Figures 2 and 8, the left-hand side of the shelf lever 182 is depressed to lower the cutter 151 and the right-hand side is raised to raise the pickup 92.

As the lever 85 is shifted from the recording position to the reproducing position, it moves across the upper face of a lever 191 (Figs. 2 and 11) which is supported through pivot pin 192 on the front wall 69 of the frame extension 8. The lever 191 carries at its free end a laterally extending bracket 193 through which a screw 194 is threaded downward. The screw 194 rests upon an extension 196 of the shelf lever 182. As the control lever 85 moves into the reproducing position, the lever 191 acts through the screw 194 to depress the extension 196 of the shelf lever. This causes the shelf lever to be rocked in a clockwise direction and hence brings about the lowering of the reproducing stylus 170 and the raising of the cutting stylus 160. A spring 197 bears against the lower side of the extension 196 to maintain the shelf lever normally in the correct position for recording so long as the control lever 85 is maintained in the recording position. The spring 197 is secured to the frame extension 8 by means of a screw 198.

As the operation of the control lever 85 is continued toward the left to the neutral position, the reproducing stylus continues to engage the record and the recording stylus continues to be held up out of the way. Movement of the control lever 85 to the neutral position does, however, have the effect of lifting the idler roller 63 out of engagement with the record. This, as has been previously pointed out, takes the pressure off the turntable 11 and permits the turntable, through its own resiliency, to rise slightly and to leave engagement with the feed roller 46 so the feeding of the turntable, the record, and the carriage is interrupted.

The rockable frame 108 is adapted to be latched down in operative position. For this purpose, it is provided with a locking plate 199 (Figs. 2 and 11) having an outturned lip 200 at its upper extremity. The plate 199 is secured to the rockable frame 108 by means of a screw 201. A latch lever 202 is pivotally mounted upon a vertical pivot screw 203, carried by an extension of the front wall 69 of frame member 8, and is formed with a locking projection 204 for cooperating with the lip 200 as in Fig. 11. The lever 202 is urged to locking position by a wire spring 205. The spring 205 has one end turned downward to penetrate deeply into the body of the lever, see Fig. 13. The other end of spring extends alongside of a screw 206 which is threaded downward into the frame member 69, and beneath a washer 207 which is held down by the head of the screw 206.

The spring is forced to bend when the locking lever is rocked away from locking position. Since the tendency of the spring is to recover its straight condition, the spring automatically restores the lever 202 to locking position when permitted to do so. The locking lever 202 is provided with a projecting arm 209 which is engaged by the control lever 85 to operate the locking lever to unlocking position as an incident of the movement of the control lever into the neutral position. When the control lever is in the neutral position, where it is held by frictional contact with spring pressed lever 191, the rockable frame 108 is free to be lifted out of the way so that the old record may be removed and a new record put in its place.

Incidental reference has been made to the backspacing ratchet wheel 126 which forms one element in the drive connections between the shaft 115 and the feed screw 116. It will be recalled that the shaft 115 and feed screw 116 are driven from the turntable through high reduction gearing consisting of the worm 113 and the worm wheel 114. This constitutes an irreversible drive so that the record, itself, is never turned backward during back-spacing operations. The frictional drive of the feed screw is provided to enable the feed screw to be operated backward relative to the shaft 115 and the worm wheel 114. Reverse operation of the feed screw will move the carriage radially outward even though there be no concomitant rotation of the record. The ratchet wheel 126 is so designed that a single tooth space feed of the wheel will shift the carriage one line space of the record, or, in the case of the illustrated mechanism, a distance of one two-hundredth of an inch.

The ratchet wheel 126 normally turns with the feed screw in a counter-clockwise direction, as viewed in Figure 8, and is adapted to be operated in the reverse direction by a pawl 210, see Fig. 2 also, which is pivotally mounted on a pivot screw 211 carried by an ear 212 of a slide 213. The slide 213 is formed with a pair of slots 214 and 215. A headed stud 216 has its shank passed through the slot 214 and secured in the frame member 8. A pin 217 formed with a collar 218 has its lower end portion passed through the slot 215 and secured in the frame member 8. An upper projecting portion of the pin 217 is connected through a tension coil spring 218 to an upright operating handle 219 which is affixed to the slide.

The nose of the pawl 210, when in retracted position, is supported by the frame member 8 in a position clear of the path of the ratchet wheel. As the slide is pulled forward, however, by the handle 219 the nose rides off the frame member 8 into position to engage a tooth of the ratchet wheel and feed it backward.

Since the back spacing operation may find the active tooth of the ratchet wheel at any point in the active range, the first back-spacing step will be of indeterminate extent. Because of the flexible mounting of the reproducing pickup, a fraction of a line, which is equivalent to a fraction of a tooth space of the ratchet wheel, is apt not to back-space the reproducing stylus at all. By operating the slide two or more steps, however, a desired amount of back-spacing can be effected.

The reproducing and recording styluses are arranged in a line at right angles to the axis of the feed screw. The feed screw necessarily extends parallel to a radius of the record. The two styluses are disposed at opposite sides of this radius and equi-distant from it. The reproducing stylus is thus caused to track the cutting stylus.

I have described what I believe to be the best embodiments of my invention. I do not wish, however, to be confined to the embodiments shown, but what I desire to cover by Letters Patent is set forth in the appended claim.

This application is a division of application, Serial No. 156,869, filed April 19, 1950, now Patent No. 2,685,772, patented August 10, 1954.

I claim:

In a dictation machine having a stylus and a carriage driven by a feed screw, in combination, a worm driven worm wheel coaxial with the feed screw, clutch means directly connecting the worm wheel to the feed screw, shaft means secured to said worm wheel at one end of said feed screw and extending axially through said feed screw beyond the other end thereof, friction clutch mechanism for frictionally driving the feed screw from said worm wheel spaced from said worm wheel a distance substantially equal to the length of the feed screw and comprising ratchet wheel means secured to said feed screw and friction plate means secured to said shaft means and frictionally engaging said ratchet wheel and a pawl operable step by step to turn the ratchet wheel in a backward direction with slippage of the clutch means and clutch mechanism to move the feed screw backward without rotating the shaft or the worm wheel.

References Cited in the file of this patent

UNITED STATES PATENTS

| | | |
|---|---|---|
| 2,127,593 | Gramann | Aug. 23, 1938 |
| 2,284,043 | Clausen | May 26, 1942 |
| 2,606,766 | Kuhlik | Aug. 12, 1952 |
| 2,613,938 | Bossmeyer | Oct. 14, 1952 |
| 2,613,939 | Moore | Oct. 14, 1952 |